(12) United States Patent
Niizawa

(10) Patent No.: US 10,507,896 B2
(45) Date of Patent: Dec. 17, 2019

(54) MANEUVERING DEVICE

(71) Applicant: NEC Corporation, Minato-ku, Tokyo (JP)

(72) Inventor: Hisaya Niizawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/557,323

(22) PCT Filed: Jan. 7, 2016

(86) PCT No.: PCT/JP2016/000055
§ 371 (c)(1),
(2) Date: Sep. 11, 2017

(87) PCT Pub. No.: WO2016/143235
PCT Pub. Date: Sep. 15, 2016

(65) Prior Publication Data
US 2018/0050783 A1 Feb. 22, 2018

(30) Foreign Application Priority Data

Mar. 12, 2015 (JP) ................................. 2015-049079

(51) Int. Cl.
B63G 8/00 (2006.01)
B64C 13/04 (2006.01)
(Continued)

(52) U.S. Cl.
CPC ............... B63G 8/001 (2013.01); B63G 8/20 (2013.01); B64C 13/0421 (2018.01); G05D 1/0692 (2013.01); B63G 2008/004 (2013.01)

(58) Field of Classification Search
CPC ........ B63H 25/02; B63H 21/22; B63H 25/42; B63G 8/00; B63G 8/001; B64C 13/04; G05D 1/00
(Continued)

(56) References Cited

U.S. PATENT DOCUMENTS 8,903,568 B1* 12/2014 Wang .................... G05D 1/0016
701/2
2009/0187292 A1* 7/2009 Hreha ...................... B64C 13/04
701/4

(Continued)

FOREIGN PATENT DOCUMENTS

JP H08-20391 A 1/1996
JP H09-130918 A 5/1997
(Continued)

OTHER PUBLICATIONS

U.S. Appl. No. 62/272,013 (Year: 2014).*
(Continued)

Primary Examiner — Yazan A Soofi

(57) ABSTRACT

Provided is a maneuvering device including: an input device (101) configured to detect an input operation for instructing movement of a mobile body to generate input information, a calculator (11) configured to change the input information so as to acquire an effect equivalent to a case in which a dead zone is set to the input operation, to thereby generate changed input information; and a controller (103) configured to control the movement of the mobile body (100a) based on the changed input information. The calculator is configured to change a range of the dead zone in accordance with a detection parameter detected in relation to the movement of the mobile body.

13 Claims, 7 Drawing Sheets

(51) Int. Cl.
*B63G 8/20* (2006.01)
*G05D 1/06* (2006.01)

(58) Field of Classification Search
USPC .......................................................... 701/21
See application file for complete search history.

(56) References Cited

U.S. PATENT DOCUMENTS

| | | | | |
|---|---|---|---|---|
| 2011/0166724 A1* | 7/2011 | Hiramatsu | ............ | B63H 21/213 702/21 |
| 2013/0299264 A1 | 11/2013 | Araki et al. | | |
| 2014/0024110 A1* | 1/2014 | Knofe et al. | ............. | B25J 13/02 435/325 |
| 2014/0324292 A1 | 10/2014 | Miichi et al. | | |
| 2014/0343728 A1* | 11/2014 | Jun | ...................... | B62D 57/032 700/259 |
| 2014/0365954 A1 | 12/2014 | Yoshizawa | | |
| 2015/0058798 A1 | 2/2015 | Ozawa | | |
| 2016/0096610 A1* | 4/2016 | Suzuki | .................. | B63H 25/42 701/21 |
| 2016/0202721 A1* | 7/2016 | Bernardy | ................ | G06F 3/038 74/471 XY |
| 2016/0213224 A1 | 7/2016 | Hatakeyama et al. | | |
| 2017/0300056 A1* | 10/2017 | Johnson | .................. | G01F 25/00 |

FOREIGN PATENT DOCUMENTS

| | | |
|---|---|---|
| JP | 2001-188626 A | 7/2001 |
| JP | 2005-246578 A | 9/2005 |
| JP | 2009-233082 A | 10/2009 |
| JP | 2010-257189 A | 11/2010 |
| JP | 2013-256139 A | 12/2013 |
| JP | 2014-215196 A | 11/2014 |
| JP | 2014-241030 A | 12/2014 |
| JP | 2015-024008 A | 2/2015 |
| JP | 2015-041216 A | 3/2015 |

OTHER PUBLICATIONS

International Search Report for PCT Application No. PCT/JP2016/000055, dated Mar. 8, 2016.
English translation of Written opinion for PCT Application No. PCT/JP2016/000055.
Japanese Office Action for JP Application No. 2017-504585 dated Jul. 10, 2019 with English Translation.

* cited by examiner

MANEUVERING DEVICE

This application is a National Stage Entry of PCT/JP2016/000055 filed on Jan. 7, 2016, which claims priority from Japanese Patent Application 2015-049079 filed on Mar. 12, 2015, the contents of all of which are incorporated herein by reference, in their entirety.

TECHNICAL FIELD

This invention relates to a maneuvering device.

BACKGROUND ART

As the related art, there exists a maneuvering device using a joystick (e.g., refer to Patent Document 1 or 2).

PRIOR ART DOCUMENTS

Patent Document
Patent Document 1: JP 2009-233082 A
Patent Document 2: JP 8-20391 A

SUMMARY OF THE INVENTION

Problem to be Solved by the Invention

A plurality of operation instructions such as a forward/backward movement and a right/left turn can be input through an operation carried out once on the joystick. Moreover, such input operations can be carried out through a touch sensor (two-dimensional pointing device) such as a touch panel and a touchpad.

However, an input operation that is not intended by an operator may be carried out due to influence of disturbance and the like on those input devices. In particular, when a tablet personal computer (PC) or the like on which a touch sensor is installed is used as the input device, the input device itself is not fixed to a mobile body, and an operation is often carried out while the input device is held by a hand. Thus, the possibility of an unintended operation increases.

This invention has an object to provide a maneuvering device, a maneuvering system, and a maneuvering method for a mobile body, which are capable of decreasing the influence of an unintended input operation.

Means to Solve the Problem

A maneuvering device according to one embodiment of this invention, comprises: input means for detecting an input operation for instructing movement of a mobile body to generate input information; calculation means for changing the input information so as to acquire an effect equivalent to a case in which a dead zone is set to the input operation, to thereby generate changed input information; and control means for controlling the movement of the mobile body based on the changed input information, wherein the calculation means is configured to change a range of the dead zone in accordance with a detection parameter detected in relation to the movement of the mobile body.

Effect of the Invention

According to this invention, it is possible to decrease the influence of the unintended input operation.

MODES FOR EMBODYING THE INVENTION

Figure 1:
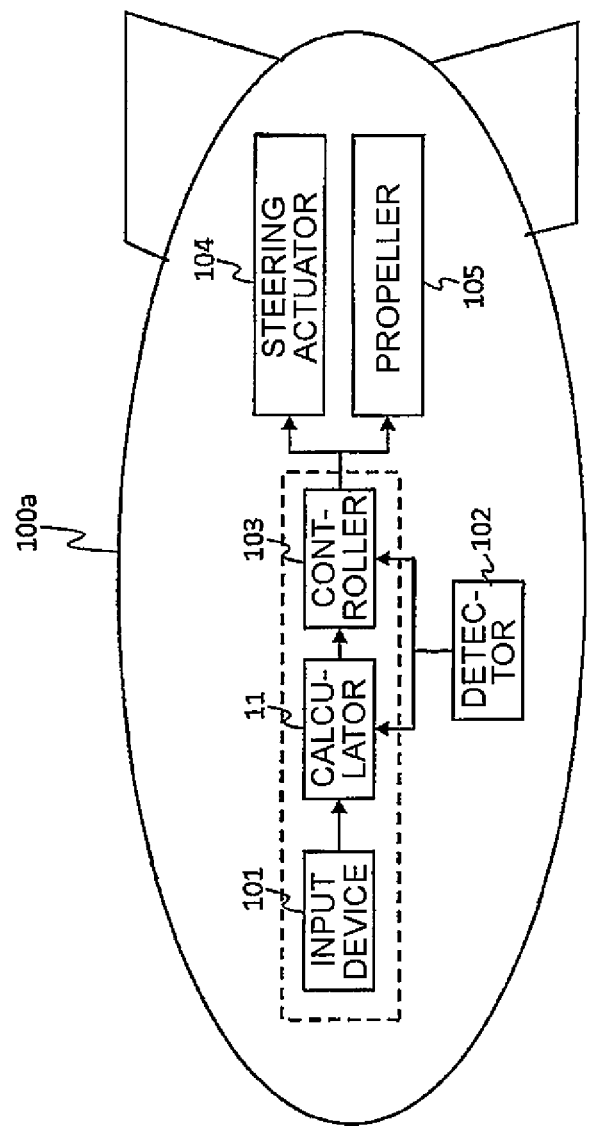
FIG. 1 is a block diagram for illustrating a configuration of a maneuvering system according to a first embodiment of this invention.

Now, referring to the drawings, a detailed description is given of embodiments of this invention.

Figure 9:
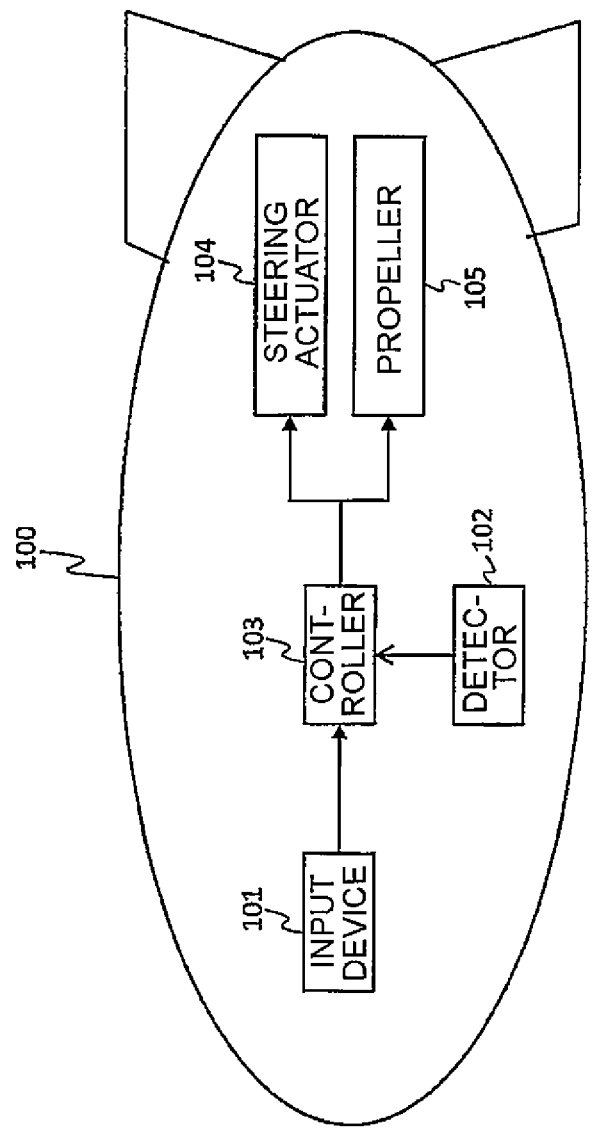
FIG. 9 is a block diagram for illustrating a configuration of a related-art maneuvering system.

First, referring to FIG. 9, a description is given of a related-art maneuvering system in order to facilitate understanding of this invention.

A maneuvering system of an underwater cruising body 100 of FIG. 9 includes an input device 101, a detector 102, a controller 103, a steering actuator 104, and a propeller 105.

The input device 101 is configured to provide various instructions (input information) to the controller 103. The instructions include instructions (operation parameters) relating to a position (particularly, a depth), an attitude, a speed, a course, and the like of the underwater cruising body 100.

The detector 102 is configured to detect various information (detection parameters) relating to movement of the underwater cruising body 100. The information includes information on the position (particularly, the depth), the attitude, the speed, an acceleration, and the like of the underwater cruising body 100.

The controller 103 is configured to carry out calculations and the like required for control based on the instruction from the input device 101 and the detected information from the detector 102 to control the steering actuator 104 and the propeller 105, thereby controlling the motion, namely, the speed, the attitude, the course, and the like of the underwater cruising body 100.

The steering actuator 104 is configured to drive horizontal steering, vertical steering, and the like in accordance with the control from the controller, thereby changing the attitude, the course, the depth, and the like of the underwater cruising body 100.

The propeller 105 generates thrust for moving forward/backward the underwater cruising body 100, thereby moving the underwater cruising body 100.

With the above-mentioned configuration, the controller 103 of the underwater cruising body 100 controls the steering actuator 104 and the propeller 105 based on the instruction from the input device 101 and the detected information from the detector 102. Then, the underwater cruising body 100 changes the position, the speed, the attitude, the course, and the like thereof by an interaction between angles of steering driven by the steering actuator 104 and the thrust generated by the propeller 105.

Incidentally, in the above-mentioned configuration, the input device 101 includes an input unit having a form of a joystick where two operation parameters are assigned to two directions orthogonal to each other. When the joystick is moved forward/backward, one operation parameter can be operated, when the joystick is moved leftward/rightward, the other operation parameter can be operated, and when the joystick is moved obliquely, the two operation parameters can simultaneously be operated. With this input unit, for example, horizontal steering and vertical steering can simultaneously be controlled by one input operation.

Assuming that no restriction is imposed on the operation direction of the joystick, for example, even when a user tries to move the joystick horizontally, the joystick may be moved forward/backward more or less. In this case, only one parameter is intended to be changed, but the other parameter is also changed. In other words, an unintended input operation may be determined to be carried out. Moreover, the hand operating the joystick may be moved by disturbance or the like, which leads to an unintended input operation. Those problems become particularly remarkable when a touch sensor (two-dimensional pointing device) such as a 0touch-pad and a touch panel is used as the input unit in place of the joystick.

Under the circumstances, in a maneuvering system according to a first embodiment of this invention, as illustrated in FIG. 1, a calculator 11 is provided between the input device 101 and the controller 103. The calculator 11 may be built into the input device 101, or may be built into the controller 103 in an actual configuration.

The calculator 11 is configured to apply calculation processing to the input information output from the input device 101, thereby providing an effect equivalent to a case in which dead zones are set to the input device 101. Moreover, the calculator 11 is configured to control ranges of the dead zones so that the ranges are changed based on one or more detection parameters from the detector 102.

Referring to FIG. 1, a detailed description is now given of the maneuvering system according to the first embodiment of this invention. In FIG. 1, the same components as those of the related art illustrated in FIG. 9 are denoted by the same reference numerals. In the following, the operation parameters are assumed to be the two parameters for controlling vertical steering and horizontal steering for the sake of a simplified description. Moreover, the input device 101 is assumed to be a tablet PC provided with a touch sensor (touchpad or touch panel) for inputting operation instructions for horizontal steering and vertical steering. Further, the detection parameter from the detector 102 is assumed to be speed information on an underwater cruising body 100a. It is to be understood that those assumptions do not limit the control object (operation parameters) of this invention and the configuration of the input device 101. The steering angles, the thrust, and the like may be controlled based on the position (depth), the attitude (pitch angle and roll angle), the acceleration, and the like as the detection parameters.

In the maneuvering system of FIG. 1, the input device 101 functions as input means for detecting the input operation for instructing the movement of the underwater cruising body 100a, which is a mobile body, to generate the input information. The input device 101 is configured to detect the input operation as a vector on a Cartesian coordinate plane.

The calculator 11 functions as calculation means for changing the input information from the input device 101, to thereby generate changed input information. As described above, the calculator 11 achieves the effect equivalent to the case in which the dead zones are set to the input device 101.

The controller 103 functions as control means for controlling the movement of the underwater cruising body 100a based on the changed input information from the calculator 11.

The input device 101, the calculator 11, and the controller 103 construct a maneuvering device for the underwater cruising body 100a. This maneuvering device is used to control the steering actuator 104 and the propeller 105, thereby changing the attitude, the course, the speed, and the position of the underwater cruising body 100a. Moreover, the detector 102 is configured to detect the information on the movement such as the attitude, the course, the speed, the position, and the like of the underwater cruising body 100a.

A shape of the touch sensor included in the input device 101 is, for example, rectangular, and an X axis and a Y axis are set along a horizontal direction and a vertical direction thereof, respectively. The X axis is associated with, for example, the steering angle of vertical steering of the underwater cruising body 100a, which is one of the operation parameters, and the Y axis is associated with, for example, the steering angle of horizontal steering, which is another one of the operation parameters.

In order to change the steering angle of vertical steering, the finger only needs to be brought into contact with the touchpad of the input device 101, and to be slid along the X axis direction while the contact state is maintained. Moreover, in order to change the steering angle of horizontal steering, the finger only needs to be brought into contact with the touchpad, and to be just slid along the Y axis direction while the contact state is maintained. In order to simultaneously change the steering angles of vertical steering and horizontal steering, the finger in contact with the touchpad only needs to be obliquely slid.

Figure 2:
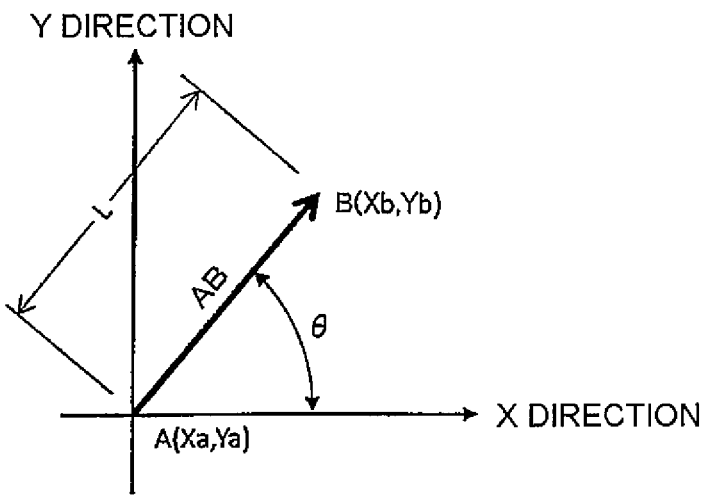
FIG. 2 is an illustration for showing an operation of an input device included in the maneuvering system of FIG. 1.

The input device 101 is configured to detect such an input operation as a vector on the Cartesian coordinate plane. For example, as shown in FIG. 2, it is assumed that the finger in contact with a point A (Xa,Ya) on the touchpad slides obliquely right upward, and then separates from the touchpad at a point B(Xb,Yb). In this case, the input device 101 detects this input operation as a vector AB on the Cartesian coordinate plane having the point A as a start point and the point B as an end point. The vector AB is represented by a length L and an angle $\theta$ (deviation angle with respect to the X axis). In practice, the input device 101 detects the coordinates of the point A and the coordinates of the point B, and acquires the length L and the angle $\theta$ from those coordinates. The input device 101 outputs information representing the acquired vector AB to the calculator 11 as the input information.

On this occasion, the vector AB is considered to change the steering angle of vertical steering associated with the X axis by an angle corresponding to an instruction amount L cos $\theta$ (=Xb−Xa), and change the steering angle of horizontal steering associated with the Y axis by an angle corresponding to an instruction amount L sin $\theta$ (=Yb−Ya). However, the length L and the angle $\theta$ of the vector AB may contain errors due to influence of an operation error, disturbance, and the like. Thus, in the first embodiment, in order to suppress the influence of such errors, the calculator 11 is caused to carry out processing that serves as if the dead zones were provided (filter function).

Figure 3:
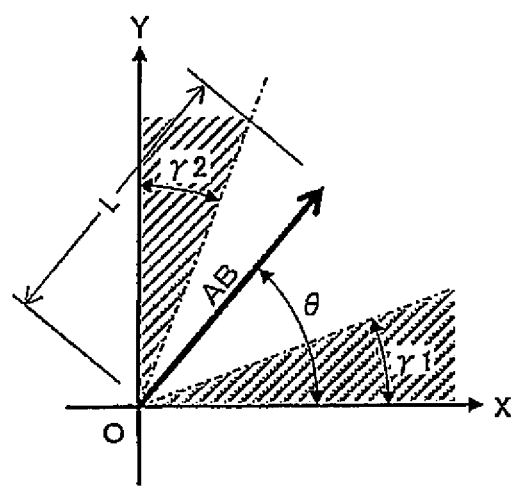
FIG. 3 is an illustration for showing dead zones set by a calculator included in the maneuvering system of FIG. 1.

Specifically, as shown in FIG. 3, the calculator 11 is assumed to arrange the vector represented by the input information so that the start point is at the origin. Then, the calculator 11 determines whether or not the angles of the vector with respect to the X axis and the Y axis are each equal to or less than a predetermined angle γ.

In FIG. 3, the predetermined angle γ includes an angle γ1 set on the X axis side, and an angle γ2 set on the Y axis side. The angle γ1 and the angle γ2 may be the same or different from each other. Those values are determined based on relationships with the operation parameters associated with the X axis and the Y axis.

Moreover, the angle γ1 and the angle γ2 are not fixed values, and are changed based on the detection parameter from the detector 102. For example, the angle γ1 and the angle γ2 may be first-order functions of the speed V of the underwater cruising body 100a. Specifically, the angle γ1 may be represented as pV+p0, and the angle γ2 may be represented as qV+q0. On this occasion, p and q are rates of the changes in the angles γ1 and γ2 with respect to the speed, and p0 and q0 are initial values. The angles γ1 and γ2 can be increased as the speed of the underwater cruising body 100a increases by setting the angle γ1 and the angle γ2 in this way. A reason for this setting is that, in the first embodiment, the detection parameter is the speed, and the operation parameters are the steering angles. Thus, the change in the attitude of the underwater cruising body 100a with respect to (the errors in) the steering angles increases as the speed increases. The relationship between the angle γ and the detection parameter is not limited to the above-mentioned example, and is determined based on the type of the detection parameter. Moreover, the values of p and q may not be constants, and may be changed based on the detection parameter (which is not limited to the speed, and may be the position or the like).

Incidentally, the calculator 11 uses the angles γ1 and γ2 set as described above to determine whether or not the angle of the vector AB with respect to the X axis is equal to or less than γ1 ($0 \leq \theta \leq \gamma1$) and whether or not the angle of the vector AB with respect to the Y axis is equal to or less than γ2 ($\pi/2 \geq \theta \geq \pi/2 - \gamma2$). In the example of FIG. 3, the direction of the vector AB is obliquely right upward ($0 \leq \theta \leq \pi/2$), but whether or not the angles of the vector AB with respect to the X axis and the Y axis are each equal to or less than the predetermined angle γ is determined through the same method for a different direction.

When the angle of the vector AB with respect to the X axis is equal to or less than the angle γ1 ($0 \leq \theta \leq \gamma1$), the calculator 11 sets the Y component of the vector AB to "0". In other words, the calculator 11 considers that the input operation in the Y axis direction has not been carried out. As a result, there is provided an effect equivalent to the case in which a dead zone is provided for the input operation in the Y axis direction.

Moreover, when the angle of the vector AB with respect to the Y axis is equal to or less than the angle γ2 ($\pi/2 \geq \theta \geq \pi/2 - \gamma2$), the calculator 11 sets the X component of the vector AB to "0". In other words, the calculator 11 considers that the input operation in the X axis direction has not been carried out. As a result, there is provided an effect equivalent to the case in which a dead zone is provided for the input operation in the X axis direction.

As described above, the calculator 11 carries out the calculation processing so as to provide a result equivalent to the case in which the dead zones are provided for the input operations carried out in the X axis direction and the Y axis direction, respectively.

The X component when the vector AB with respect to the X axis is equal to or less than the angle γ1 ($0 \leq \theta \leq \gamma1$) and the Y component when the vector AB with respect to the Y axis is equal to or less than the angle γ2 ($\pi/2 \geq \theta \geq \pi/2 - \gamma2$) are calculated by the calculator 11 so as to be changed as in a case where the angles of the vector AB with respect to the X axis and the Y axis are both more than the predetermined angle γ.

Figure 4:
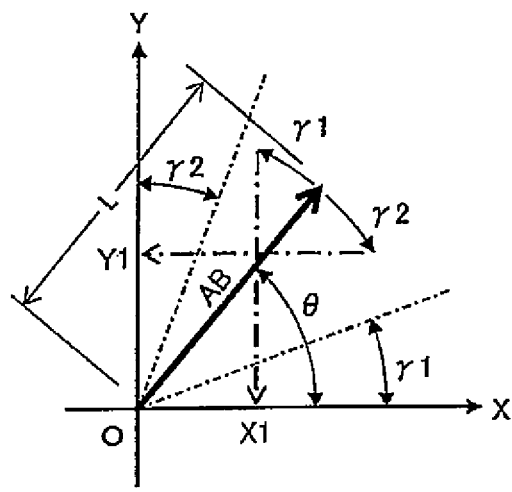
FIG. 4 is an illustration for showing a method of acquiring an X component and a Y component of a vector in the calculator.

A description is now given of a case in which both the angles of the vector AB with respect to the X axis and the Y axis are more than the predetermined angle γ. In this case, as shown in FIG. 4, an X component X1 is acquired by tilting the vector AB by the angle γ1 toward the Y axis side. On this occasion, the X component X1 is $L \cos(\theta + \gamma1)$. Moreover, a Y component Y1 is acquired by tilting the vector AB by the angle γ2 toward the X axis side. On this occasion, the Y axis component Y1 is $L \sin(\theta - \gamma2)$. The X component X1 and the Y component Y1 acquired in this way are smaller than an X component (Xb−Xa) and a Y component (Yb−Ya) based on the length L of the vector AB represented by the input information. As a result, the influence of the error component contained in the length L can be decreased.

The X component when the vector AB with respect to the X axis is equal to or less than the angle γ1 ($0 \leq \theta \leq \gamma1$) and the Y component when the vector AB with respect to the Y axis is equal to or less than the angle γ2 ($\pi/2 \geq \theta \geq \pi/2 - \gamma2$) may be $L \cos \theta$ and $L \sin \theta$, respectively, for the sake of simplified calculation processing. Alternatively, the X component and the Y component may simply be L.

Then, the calculator 11 amplifies the X component and the Y component of the vector AB acquired as described above by a sensitivity (amplification factor) k set in advance. The sensitivity k includes a sensitivity kx for the X component and a sensitivity ky for the Y component. The sensitivity kx and the sensitivity ky may be the same value, or values different from each other. When the sensitivities kx and ky are equal to each other, the length L of the vector AB may be amplified by the amplification factor k in advance.

The calculator 11 generates changed input information representing an amplified X component $kxL \cos(\theta + \gamma1)$ and an amplified Y component $kyL \sin(\theta - \gamma2)$, and output the changed input information to the controller 103 as instruction amounts (command steering angle values).

The controller 103 controls the steering actuator 104 and the propeller 105 based on the changed input information from the calculator 11. As a result, the underwater cruising body 100a changes the position, the attitude, the course, the speed, and the like.

As described above, according to the first embodiment, the influence of the error contained in the input operation caused by the disturbance and the operation error can be suppressed by providing the dead zones in the two directions orthogonal to each other for the input operation from the touchpad. As a result, the underwater cruising body 100a can stably cruise.

Next, a second embodiment of this invention is described in detail.

A configuration of a maneuvering system according to the second embodiment is the same as that of the maneuvering system according to the first embodiment. However, the operation of the calculator 11 is different.

Figure 5:
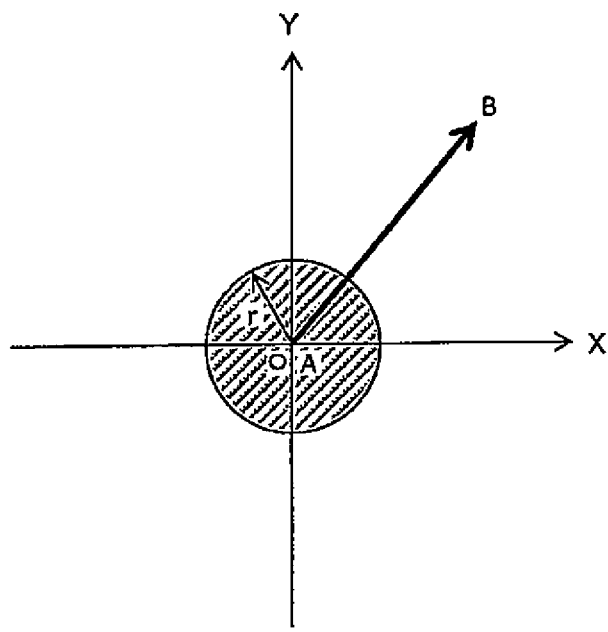
FIG. 5 is an illustration for showing a dead zone set by a calculator of a maneuvering system according to a second embodiment of this invention.

As shown in FIG. 5, the calculator 11 is configured to determine whether or not the length L of the vector AB is equal to or more than a predetermined length r. The predetermined length r is changed in accordance with the detection parameter from the detector 102 as the predetermined angle γ of the first embodiment.

When the length L of the vector AB is equal to or less than r, the calculator 11 sets the length L of the vector AB to "0". In other words, the calculator 11 considers that the input operation has not been carried out, and stops subsequent processing. As a result, the calculator 11 does not generate or output the changed input information to the controller 103.

In the second embodiment, for example, when the detector 102 includes an accelerometer, the predetermined length r may be changed in accordance with a detected acceleration (detection parameter) from the accelerometer. Under a state in which the underwater cruising body 100a is positioned close to the sea surface, and greatly swings under a rough sea condition, the possibility of an unintentional touch to the touchpad increases. Moreover, the slide distance thereof is predicted to increase. Therefore, the influence from an error input operation can be decreased by increasing the length r under a state in which a large acceleration is detected.

As described above, according to the second embodiment, the dead zone is set to an input operation having a length equal to or less than the predetermined length r. As a result, when the slide distance is extremely shorter than the case in which the finger is intentionally slid, for example, a case in which the touchpad is touched by mistake, an error instruction is prevented from being input to the controller 103. The second embodiment may be combined with the first embodiment.

Next, a third embodiment of this invention is described in detail.

A configuration of a maneuvering system according to the third embodiment is the same as that of the maneuvering system according to the first embodiment. However, the operation of the calculator 11 is different. Moreover, in the third embodiment, the detector 102 is a depth meter.

The calculator 11 is configured to change the angle γ based on the detection parameter from the depth meter. For example, when the position (depth) is close to the sea surface, the angle γ is decreased, and when the position (depth) is separated from the sea surface, the angle γ is increased. As a result, the influence on the motion of the underwater cruising body 100a by the error input operation under a state in which a risk of collision against the bottom of the sea or the like exists can be decreased.

Next, a fourth embodiment of this invention is described in detail.

A configuration of a maneuvering system according to the fourth embodiment is the same as that of the maneuvering system according to the first embodiment. The input device 101 includes a touchpad, which is a multi-touch sensor capable of detecting a plurality of points simultaneously in contact with one another.

Figure 6:
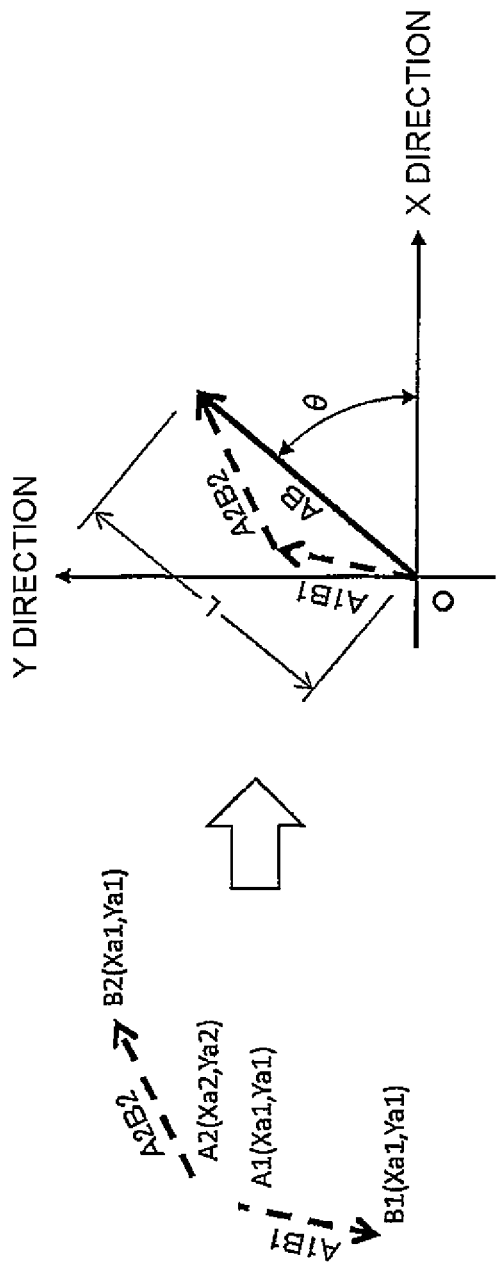
FIG. 6 is an illustration for showing processing carried out by an input device of a maneuvering system according to a fourth embodiment of this invention.

As shown in FIG. 6, when the input device 101 detects contacts (slides) continuing from two points A1 and A2 to respective points B1 and B2, the input device 101 generates input information representing a difference vector AB between vectors A1B1 and A2B2 representing those contacts of the fingers. Which one of the two vectors A1B1 and A2B2 is to be set to an inverse vector is determined based on the lengths of the vectors. This assumes a case in which two fingers are used, one of the fingers is used as a support, the other finger is slid, and the finger used as the support moves to a direction opposite to a direction of the slid finger. This holds true irrespective of whether the interval between the two fingers is increased or decreased.

Calculation processing is applied to the input information generated in this way from the input device 101 as in the first, second, and third embodiments.

Next, a fifth embodiment of this invention is described in detail.

Figure 7:
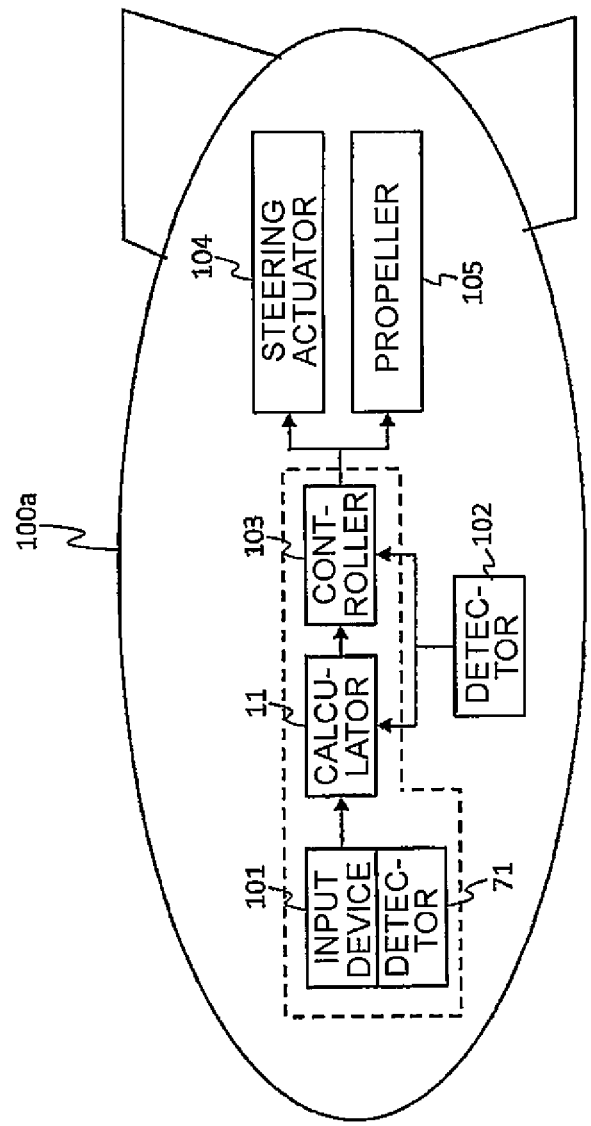
FIG. 7 is a block diagram for illustrating a configuration of a maneuvering system according to a fifth embodiment of this invention.

A configuration of a maneuvering system according to the fifth embodiment is substantially the same as that of the maneuvering system according to the first embodiment. However, as illustrated in FIG. 7, in the fifth embodiment, a (an acceleration) detector 71 for detecting an acceleration is mounted to (or integrated into) the input device 101.

Figure 8:
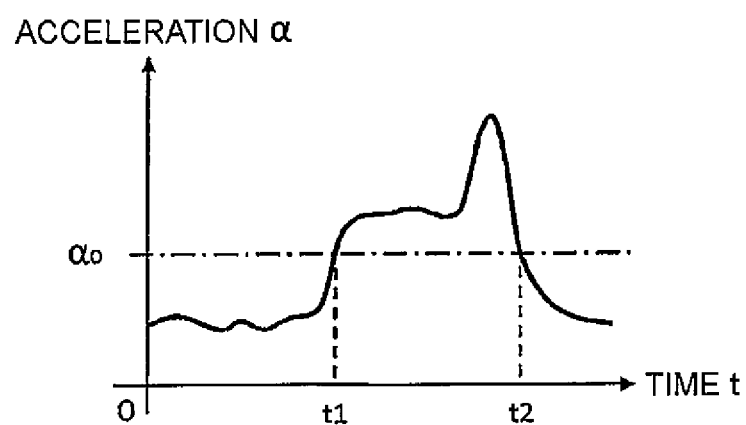
FIG. 8 is a graph for showing an output example of an acceleration detector included in the maneuvering system of FIG. 7.

When an acceleration a more than a threshold α0 set in advance is detected by the detector 71, the input device 101 stops the detection of the input operation. For example, when the acceleration a detected by the detector 71 temporally changes as shown in FIG. 8, the detection of the input operation is stopped at least during a period from a time point t1 to a time point t2. This is to prevent an input operation from being determined to be an intended input operation in a case where the input device 101 falls down and the touchpad comes in contact with something.

Moreover, a case in which the hand or the like touches the touchpad when the fallen input device 101 is picked up may be assumed so as to maintain a state in which the detection of the input operation is stopped until a certain period elapses even when the acceleration α becomes more than the threshold α0, and then becomes equal to or less than the threshold α0.

In the fifth embodiment, the detection of an unintended input operation can be prevented in this way. The fifth embodiment may be combined with any of the above-mentioned other embodiments.

This invention is described above by way of some embodiments, but this invention is not limited to the above-mentioned embodiments and various modifications and changes can be made thereto. For example, the underwater cruising body is exemplified as the mobile body in the above-mentioned embodiments, but this invention may also be applied to other mobile bodies such as the ship, the vehicle, and the airplane. Moreover, a description is given of the case in which the touchpad is used in the above-mentioned embodiments, but this invention may be applied to a case in which another input device, for example, a joystick is used. Further, in the above-mentioned embodiments, a description is given of the case in which the input device, the calculator, and the controller are independent of one another, but the functions thereof may be implemented by one computer. Moreover, this invention may be implemented as a program for causing a computer to carry out the above-mentioned operations.

Further, a part or all of the above-mentioned embodiments may be described as the following supplementary notes, but are not limited to the following supplementary notes.

(Supplementary Note 1)

A maneuvering device, comprising: input means for detecting an input operation for instructing movement of a mobile body to generate input information; calculation means for changing the input information so as to acquire an effect equivalent to a case in which a dead zone is set to the input operation, to thereby generate changed input information; and control means for controlling the movement of the mobile body based on the changed input information, wherein the calculation means is configured to change a range of the dead zone in accordance with a detection parameter detected in relation to the movement of the mobile body.

(Supplementary Note 2)

The maneuvering device according to Supplementary Note 1, wherein: the input means is configured to detect the input operation as a vector on a Cartesian coordinate plane; and the calculation means is configured to set, when an angle of the vector with respect to one of an X axis and a Y axis is equal to or less than a predetermined angle $\gamma$, a component in a direction along another one of the X axis and the Y axis to "0", to thereby acquire the effect equivalent to the case in which the dead zone is set.

(Supplementary Note 3)

The maneuvering device according to Supplementary Note 2, wherein the predetermined angle $\gamma$ includes an angle $\gamma 1$ with respect to the X axis and an angle $\gamma 2$ with respect to the Y axis, and the angle $\gamma 1$ and the angle $\gamma 2$ are different from each other.

(Supplementary Note 4)

The maneuvering device according to Supplementary Note 2 or 3, wherein, when the angle of the vector with respect to the X axis and the angle of the vector with respect to the Y axis are each more than the predetermined angle $\gamma$, the calculation means acquires, as components of the vector, an X component obtained when a direction of the vector is changed so as to separate from the Y axis by the predetermined angle $\gamma$ and a Y component obtained when the direction of the vector is changed so as to separate from the X axis by the predetermined angle $\gamma$.

(Supplementary Note 5)

The maneuvering device according to Supplementary Note 1, wherein: the input means is configured to detect the input operation as a vector on a Cartesian coordinate plane; and the calculation means is configured to set, when a length of the vector is equal to or less than a predetermined length r, the length of the vector to "0", to thereby acquire the effect equivalent to the case in which the dead zone is set.

(Supplementary Note 6)

The maneuvering device according to any one of Supplementary Notes 2 to 5, wherein the X axis and the Y axis of the Cartesian coordinate plane are associated with operation parameters different from each other, and an X component and a Y component of the vector are used to control the operation parameters associated with the X axis and the Y axis, respectively.

(Supplementary Note 7)

The maneuvering device according to any one of Supplementary Notes 1 to 6, wherein the detection parameter comprises at least one of a position, an attitude, a speed, and an acceleration of the mobile body.

(Supplementary Note 8)

The maneuvering device according to Supplementary Note 2, 3, or 4, wherein the detection parameter is a speed of the mobile body, and the predetermined angle $\gamma$ is increased as the speed increases.

(Supplementary Note 9)

The maneuvering device according to any one of Supplementary Notes 1 to 8, wherein the input means comprises a touch sensor.

(Supplementary Note 10)

The maneuvering device according to any one of Supplementary Notes 1 to 9, wherein the input means comprises acceleration detection means for detecting an acceleration, and is configured to invalidate the input operation on the input means for at least a certain period after the acceleration detection means detects an acceleration more than a predetermined acceleration.

(Supplementary Note 11)

The maneuvering device according to any one of Supplementary Notes 2 to 6, in which the calculation means is configured to further change the input information so as to amplify a component of the vector by an amplification factor k, which is changed in accordance with the detection parameter.

(Supplementary Note 12)

The maneuvering device according to Supplementary Note 11, in which the amplification factor k includes an amplification factor kx for amplifying an X component of the vector and an amplification factor ky for amplifying a Y component of the vector, and the amplification factor kx and the amplification factor ky are values different from each other.

(Supplementary Note 13)

A maneuvering system, including: input means for detecting an input operation for instructing movement of a mobile body to generate input information; detection means for outputting a parameter relating to the movement of the mobile body as a detection parameter; calculation means for changing the input information so as to acquire an effect equivalent to a case in which a dead zone is set to the input operation, to thereby generate changed input information; control means for generating a control signal for controlling the movement of the mobile body based on the changed input information; and drive means for moving the mobile body in accordance with the control signal, in which the calculation means is configured to change a range of the dead zone in accordance with a detection parameter detected in relation to the movement of the mobile body.

(Supplementary Note 14)

The maneuvering system according to Supplementary Note 13, wherein: the input means is configured to detect the input operation as a vector on a Cartesian coordinate plane; and the calculation means is configured to set, when an angle of the vector with respect to one of an X axis and a Y axis is equal to or less than a predetermined angle $\gamma$, a component in a direction along another one of the X axis and the Y axis to "0", to thereby acquire the effect equivalent to the case in which the dead zone is set.

(Supplementary Note 15)

The maneuvering system according to Supplementary Note 14, wherein the predetermined angle $\gamma$ includes an angle $\gamma 1$ with respect to the X axis and an angle $\gamma 2$ with respect to the Y axis, and the angle $\gamma 1$ and the angle $\gamma 2$ are different from each other.

(Supplementary Note 16)

The maneuvering system according to Supplementary Note 14 or 15, wherein, when the angle of the vector with respect to the X axis and the angle of the vector with respect to the Y axis are each more than the predetermined angle $\gamma$, the calculation means acquires, as components of the vector, an X component obtained when a direction of the vector is changed so as to separate from the Y axis by the predetermined angle $\gamma$ and a Y component obtained when the direction of the vector is changed so as to separate from the X axis by the predetermined angle $\gamma$.

(Supplementary Note 17)

The maneuvering system according to Supplementary Note 13, wherein: the input means is configured to detect the input operation as a vector on a Cartesian coordinate plane; and the calculation means is configured to set, when a length of the vector is equal to or less than a predetermined length r, the length of the vector to "0", to thereby acquire the effect equivalent to the case in which the dead zone is set.

(Supplementary Note 18)

The maneuvering system according to any one of Supplementary Notes 14 to 17, wherein the X axis and the Y axis of the Cartesian coordinate plane are associated with operation parameters different from each other, and an X component and a Y component of the vector are used to control the operation parameters associated with the X axis and the Y axis, respectively.

(Supplementary Note 19)

The maneuvering system according to any one of Supplementary Notes 13 to 18, wherein the detection parameter comprises at least one of a position, an attitude, a speed, and an acceleration of the mobile body.

(Supplementary Note 20)

The maneuvering system according to Supplementary Note 14, 15, or 16, wherein the detection parameter is a speed of the mobile body, and the predetermined angle $\gamma$ is increased as the speed increases.

(Supplementary Note 21)

The maneuvering system according to any one of Supplementary Notes 13 to 20, wherein the input means comprises a touch sensor.

(Supplementary Note 22)

The maneuvering system according to any one of Supplementary Notes 13 to 21, wherein the input means comprises acceleration detection means for detecting an acceleration, and is configured to invalidate the input operation on the input means for at least a certain period after the acceleration detection means detects an acceleration more than a predetermined acceleration.

(Supplementary Note 23)

The maneuvering system according to any one of Supplementary Notes 14 to 18, in which the calculation means is configured to further change the input information so as to amplify a component of the vector by an amplification factor k, which is changed in accordance with the detection parameter.

(Supplementary Note 24)

The maneuvering system according to Supplementary Note 23, in which the amplification factor k includes an amplification factor kx for amplifying an X component of the vector and an amplification factor ky for amplifying a Y component of the vector, and the amplification factor kx and the amplification factor ky are values different from each other.

(Supplementary Note 25)

A control method for a mobile body, including: detecting an input operation for instructing movement of a mobile body to generate input information; changing, when the input information is changed so as to acquire an effect equivalent to a case in which a dead zone is set to the input operation, to thereby generate changed input information, a range of the dead zone in accordance with a detection parameter detected in relation to the movement of the mobile body; and controlling the movement of the mobile body based on the changed input information.

(Supplementary Note 26)

The control method for the mobile body according to Supplementary Note 25, further including: detecting the input operation as a vector on a Cartesian coordinate plane to generate the input information; and setting, when an angle of the vector with respect to one of an X axis and a Y axis is equal to or less than a predetermined angle $\gamma$, a component in a direction along another one of the X axis and the Y axis to "0", to thereby acquire the effect equivalent to the case in which the dead zone is set.

(Supplementary Note 27)

The control method for the mobile body according to Supplementary Note 26, wherein the predetermined angle $\gamma$ includes an angle $\gamma 1$ with respect to the X axis and an angle $\gamma 2$ with respect to the Y axis, and the angle $\gamma 1$ and the angle $\gamma 2$ are different from each other.

(Supplementary Note 28)

The control method for the mobile body according to Supplementary Note 26 or 27, further including acquiring, in the changing of the input information, when the angle of the vector with respect to the X axis and the angle of the vector with respect to the Y axis are each more than the predetermined angle $\gamma$, as components of the vector, an X component by changing a direction of the vector so as to separate from the Y axis by the predetermined angle $\gamma$ and a Y component by changing the direction of the vector so as to separate from the X axis by the predetermined angle $\gamma$.

(Supplementary Note 29)

The control method for the mobile body according to Supplementary Note 25, further including: detecting the input operation as a vector on a Cartesian coordinate plane; and setting, when a length of the vector is equal to or less than a predetermined length r, the length of the vector to "0", to thereby acquire the effect equivalent to the case in which the dead zone is set.

(Supplementary Note 30)

The control method for the mobile body according to any one of Supplementary Notes 26 to 29, wherein the X axis and the Y axis of the Cartesian coordinate plane are associated with operation parameters different from each other, and an X component and a Y component of the vector are used to control the operation parameters associated with the X axis and the Y axis, respectively.

(Supplementary Note 31)

The control method for the mobile body according to any one of Supplementary Notes 25 to 30, wherein the detection parameter comprises at least one of a position, an attitude, a speed, and an acceleration of the mobile body.

(Supplementary Note 32)

The control method for the mobile body according to Supplementary Note 26, 27, or 28, wherein the detection parameter is a speed of the mobile body, and the predetermined angle $\gamma$ is increased as the speed increases.

(Supplementary Note 33)

The control method for the mobile body according to any one of Supplementary Notes 26 to 30, further including changing the input information so as to amplify a component of the vector by an amplification factor k, which is changed in accordance with the detection parameter, when the input information is changed.

(Supplementary Note 34)

The control method for the mobile body according to Supplementary Note 33, in which the amplification factor k includes an amplification factor kx for amplifying an X component of the vector and an amplification factor ky for amplifying a Y component of the vector, and the amplification factor kx and the amplification factor ky are values different from each other.

This application claims priority from Japanese Patent Application No. 2015-049079, filed on Mar. 12, 2015, the entire disclosure of which is incorporated herein by reference.

EXPLANATION OF REFERENCE NUMERALS 11 calculator
71 detector 100, 100a underwater cruising body
101 input device
102 detector
103 controller
104 steering actuator
105 propeller

What is claimed is:

1. A maneuvering device, comprising:
an input device configured to detect an input operation for instructing movement of a mobile body to generate input information;
a calculator configured to change the input information so as to acquire an effect equivalent to a case in which a dead zone is set to the input operation, to thereby generate changed input information; and
a controller configured to control the movement of the mobile body based on the changed input information,
wherein the calculator is configured to change a range of the dead zone in accordance with a detection parameter detected in relation to the movement of the mobile body, and
wherein:
the input device is configured to detect the input operation as a vector on a Cartesian coordinate plane; and
the calculator is configured to set, when an angle of the vector with respect to one of an X axis and a Y axis is equal to or less than a predetermined angle $\gamma$, a component in a direction along another one of the X axis and the Y axis to "0", to thereby acquire the effect equivalent to the case in which the dead zone is set.

2. The maneuvering device according to claim 1, wherein the predetermined angle $\gamma$ includes an angle $\gamma 1$ with respect to the X axis and an angle $\gamma 2$ with respect to the Y axis, and the angle $\gamma 1$ and the angle $\gamma 2$ are different from each other.

3. The maneuvering device according to claim 1, wherein, when the angle of the vector with respect to the X axis and the angle of the vector with respect to the Y axis are each more than the predetermined angle $\gamma$, the calculator acquires, as components of the vector, a Y component obtained when a direction of the vector is changed so as to separate from the Y axis by the predetermined angle $\gamma$ and an X component obtained when the direction of the vector is changed so as to separate from the X axis by the predetermined angle $\gamma$.

4. The maneuvering device according to claim 1, wherein the X axis and the Y axis of the Cartesian coordinate plane are associated with operation parameters different from each other, and an X component and a Y component of the vector are used to control the operation parameters associated with the X axis and the Y axis, respectively.

5. The maneuvering device according to claim 1, wherein the detection parameter comprises at least one of a position, an attitude, a speed, and an acceleration of the mobile body.

6. The maneuvering device according to claim 1, wherein the detection parameter is a speed of the mobile body, and the predetermined angle $\gamma$ is increased as the speed increases.

7. The maneuvering device according to claim 1, wherein the input device comprises a touch sensor.

8. The maneuvering device according to claim 1, wherein the input device comprises an acceleration detector configured to detect an acceleration, and is configured to invalidate the input operation on the input device for at least a certain period after the acceleration detector detects an acceleration more than a predetermined acceleration.

9. A maneuvering device, comprising:
an input device configured to detect an input operation for instructing movement of a mobile body to generate input information;
a calculator configured to change the input information so as to acquire an effect equivalent to a case in which a dead zone is set to the input operation, to thereby generate changed input information; and
a controller configured to control the movement of the mobile body based on the changed input information,
wherein the calculator is configured to change a range of the dead zone in accordance with a detection parameter detected in relation to the movement of the mobile body, and wherein:
the input device is configured to detect the input operation as a vector on a Cartesian coordinate plane; and
the calculator is configured to set, when a length of the vector is equal to or less than a predetermined length r, the length of the vector to "0", to thereby acquire the effect equivalent to the case in which the dead zone is set.

10. The maneuvering device according to claim 9, wherein the X axis and the Y axis of the Cartesian coordinate plane are associated with operation parameters different from each other, and an X component and a Y component of the vector are used to control the operation parameters associated with the X axis and the Y axis, respectively.

11. The maneuvering device according to claim 9, wherein the detection parameter comprises at least one of a position, an attitude, a speed, and an acceleration of the mobile body.

12. The maneuvering device according to claim 9, wherein the input device comprises a touch sensor.

13. The maneuvering device according to claim 9, wherein the input device comprises an acceleration detector configured to detect an acceleration, and is configured to invalidate the input operation on the input device for at least a certain period after the acceleration detector detects an acceleration more than a predetermined acceleration.

* * * * *